May 23, 1939.  G. L. GRUNDMANN  2,159,793

CAPACITOR

Filed Jan. 5, 1938

Inventor
Gustave L. Grundmann
By
Attorney

Patented May 23, 1939

2,159,793

UNITED STATES PATENT OFFICE 2,159,793

CAPACITOR

Gustave L. Grundmann, Westmont, N. J., assignor to Radio Corporation of America, a corporation of Delaware Application January 5, 1938, Serial No. 183,471

2 Claims. (Cl. 175—41)

This invention relates to capacitors and has special reference to the provision of improvements in fixed capacitors of a value of capacitance capable of being utilized in so-called "micro-wave" and ultra-high frequency signaling systems.

The capacitors usually employed in high frequency work comprise one or more elemental capacitors constituted of alternate metal and dielectric layers. Such capacitors, as heretofore constructed, are objectionable in that the current path through the assembly is longer than need be, so that unwanted inductance is introduced into the capacitor. The added or "spurious" inductance of a capacitor may be so great as to seriously alter the impedance of the circuit in which it is connected, especially so if the circuit is designed to transmit electrical waves of but a few centimeters in wave-length.

Accordingly, the principal object of the present invention is to provide a fixed capacitor having an extremely low effective inductance rating.

Another object of the invention is to provide a simple, inexpensive and trouble-free by-pass capacitor and one which may be readily attached as to the chassis of radio set.

Figure 1:
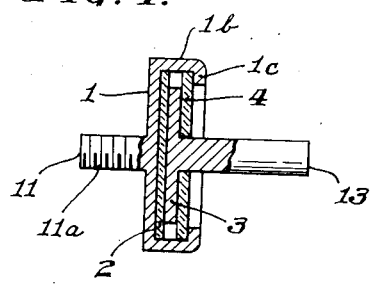
Figure 2:
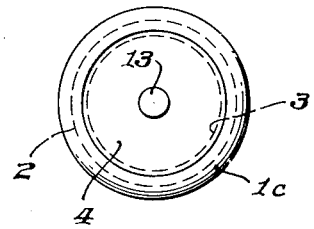
Figure 3:
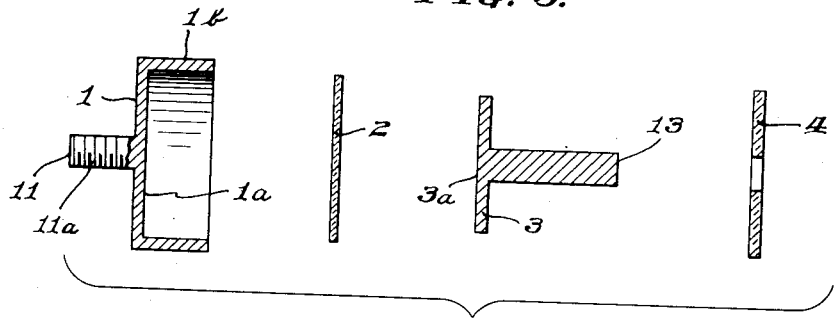
Figure 4:
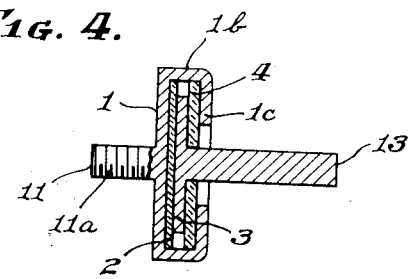
Figure 5:
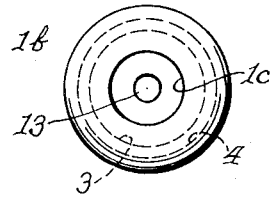

Other objects and advantages together with certain details of construction will be apparent and the invention itself will be best understood by reference to the following specification and to the accompanying drawing, wherein Figure 1 is a longitudinal sectional view, Figure 2 is a plan view, Figure 3 is an exploded view of an elemental capacitor constructed in accordance with the principle of the invention, Figure 4 is a longitudinal sectional view, and Figure 5 a plan view of a capacitor of modified construction.

Like reference characters represent the same or corresponding parts in all figures.

The elemental capacitor of Figs. 1, 2 and 3 comprises two metal armatures or electrodes 1 and 3, respectively, an interposed dielectric layer or plate 2 and an insulating disc or washer 4 superimposed upon that surface of electrode 3 which is opposite to that contiguous the dielectric plate 2. The electrodes 1 and 3 may be constituted of brass or other suitable metal; each has a substantially flat, preferably circular, electrode surface 1a, 3a respectively. Electrode 1 is provided with an upstanding wall or rim 1b whose inner surface forms a right angle continuation of the flat electrode surface 1a. The interposed dielectric layer 2 may be constituted of mica, sheeted or sprayed styrol (or the polymerization products thereof) or other suitable dielectric material. The diameter of the dielectric layer 2 and of the insulating washer 4 corresponds substantially to that of the internal diameter of the cup-shape electrode 1, so that they may be snug-fitted therein. The diameter of electrode 3 is somewhat less than the internal diameter of electrode 1; it is adapted to be maintained out of short-circuiting contact with the rim 1b, by the insulating washer 4, which is superimposed upon the outwardly facing surface of electrode 3. In assembling the capacitor of Figs. 1, 2 and 3, the dielectric material is first applied to, or fitted snugly against, the electrode surface 1a of the cup-shape electrode 1; the electrode 3 of smaller diameter is placed contiguous the opposite surface of layer 2, the insulating washer 4 is then fitted within the cup on top of the electrode 3 and finally the protruding rim of the upstanding wall 1b of electrode 1 is rolled, crimped, or otherwise bent inwardly so that only a narrow edge portion 1c contacts the exposed outer surface of the washer 4. With the parts thus assembled, electrode 3 is maintained in spaced insulating alignment with respect to the cup-shape electrode 1 by the clamping force applied to the outer surface of the washer 4.

As previously pointed out, the present invention contemplates an elemental capacitor characterized by its extremely low effective inductance rating. This desired characteristic is achieved in accordance with the invention by connecting the necessary electrode leads to the mid-points of the electrode plates, so that a radial electron or current path is established through the electrodes which is substantially no longer than the radius of the larger electrode 1. The current path, and hence the effective inductance of the capacitor of the present invention is thus reduced by at least one-half as compared with prior art capacitors wherein the electrode leads are affixed to diametrically opposite points on the edges of the electrodes. As compared with capacitors wherein the electrode leads are affixed to adjacent points on the electrodes, the capacitors of the present invention provide an even greater reduction in inductance rating.

The electrode leads, here designated 11 and 13, are preferably integral with the electrodes 1 and 3 to which they are respectively connected. One or both of the leads are preferably screw-threaded as indicated at 11a, so that it may be received in a complementary threaded orifice in a metal chassis or plate (not shown) when the capacitor is employed as a "by-pass" for radio frequency currents. Alternatively, the threads 11a may be omitted and the projecting connector 11 riveted or otherwise affixed to the chassis.

The capacitor of Fig. 4 is similar in all of its essential parts to the capacitor of Figs. 1 to 3, inclusive; its capacitive rating however is somewhat higher. The higher capacitive rating is achieved without any increase in overall dimensions by extending the turned in rim 1c of the cup-shape electrode 1 beyond the periphery of the smaller electrode 3.

Other modifications of the invention will suggest themselves to those skilled in the art. It is to be understood, therefore, that the foregoing is to be interpreted as illustrative and not in a limiting sense, except as required by the prior art and the spirit of the appended claims.

What is claimed is:

1. A capacitor comprising a pair of electrode plates of unequal diameter, an interposed dielectric layer, a pair of electrode leads connected respectively to points substantially in the center of the outwardly facing surfaces of said plates, an insulating washer superimposed on the plate of smaller diameter and through which its lead extends, and an inwardly turned rim on the plate of larger diameter for exerting a clamping force upon said insulating washer.

2. The invention as set forth in claim 1 wherein said inwardly turned rim extends inwardly beyond the periphery of the smaller of said electrode plates.

GUSTAVE L. GRUNDMANN.